United States Patent
Hsu

(10) Patent No.: US 6,520,783 B2
(45) Date of Patent: Feb. 18, 2003

(54) ELECTRICAL CARD CONNECTOR HAVING POLARIZATION MECHANISM

(75) Inventor: Hugh Chi Hsu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/015,032

(22) Filed: Dec. 11, 2001

(65) Prior Publication Data

US 2003/0017732 A1 Jan. 23, 2003

(30) Foreign Application Priority Data

Jul. 20, 2001 (TW) ..................................... 90212265 U

(51) Int. Cl.⁷ .............................................. H01R 13/62
(52) U.S. Cl. ...................................... 439/157; 439/159
(58) Field of Search ............................... 439/152–158, 439/159, 160, 328

(56) References Cited

U.S. PATENT DOCUMENTS

| | | | | | |
|---|---|---|---|---|---|
| 5,421,737 A | * | 6/1995 | Chen et al. | ................. | 439/157 |
| 5,456,610 A | * | 10/1995 | Banakis et al. | ............. | 439/157 |
| 5,533,906 A | * | 7/1996 | Abe | ........................... | 439/159 |
| 6,120,309 A | * | 9/2000 | Hara | .......................... | 439/159 |
| 6,361,339 B1 | * | 3/2002 | Zhang et al. | ............... | 439/160 |

\* cited by examiner

Primary Examiner—Hien Vu
(74) Attorney, Agent, or Firm—WeiTe Chung

(57) ABSTRACT

An electrical card connector (1) includes a shield housing (10), a contact module (12), a switch module (13), an ejecting mechanism (14) and a polarization mechanism (16). A blocking tab (104) extends into a groove (113) defined in one side of the housing. The ejecting mechanism accommodated in the groove includes a slide block (141) which can slide along a direction of insertion of an electrical card (2). The slide block has a support arm (143). An elastic arm (160) attached to the support arm has an arcuate engaging portion (163) oriented toward an inside of the connector. When the card is correctly inserted into the connector, the engaging portion is received in a notch (20) of the card. When the card is wrongly inserted, the engaging portion is pushed outwardly by a lateral edge of the card and blocked by the blocking tab.

7 Claims, 6 Drawing Sheets

ELECTRICAL CARD CONNECTOR HAVING POLARIZATION MECHANISM

BACKGROUND OF THE INVENTION

1. Field of the Invention

The present invention relates to electrical card connectors, and particularly to electrical card connectors that are liable to receive complementary electrical cards inserted thereinto with a wrong orientation.

2. Description of the Related Art

With constant development of communications and computer technology, more and more electrical cards are being designed to meet various requirements. Electrical card connectors are used to connect these electrical cards with corresponding mainframes. Proper connection between an electrical card and a corresponding electrical card connector must be ensured. Conventionally, a bevel is formed on an electrical card, and the electrical card connector has a ramp portion matching the bevel. Such a card and card connector are disclosed in Japan Patent Application No. 11-66247. When the card is inserted into the connector, the bevel must mate with the ramp so that the card can electrically connect with the connector correctly. If the card is wrongly inserted into the connector, correct electrical connection is not achieved. Moreover, damage to contacts of the connector may occur, because a leading edge of the card wrongly presses the contacts.

To prevent damage to the contacts, a mechanism is required for preventing the leading edge of a wrongly inserted card from reaching the contacts. The present invention proposes such a mechanism to solve the problems of the related art.

BRIEF SUMMARY OF THE INVENTION

It is an object of the present invention to provide an electrical card connector which is protected from being damaged by an electrical card that has been wrongly inserted into the connector.

According to the present invention, an electrical card connector includes a shield housing, a contact module, a switch module, an ejecting mechanism and a polarization mechanism. The housing covers the contact module. A pair of grooves is defined in opposite sides of the housing. A blocking tab is bent perpendicularly from an upper wall of the housing into one of the grooves. The ejecting mechanism is accommodated in that same groove, and includes a slide block which can slide along a direction of insertion of an electrical card. The slide block has a support arm and an ejecting arm. A ramp is formed between the support arm and the ejecting arm, for mating with a bevel of the card. An elastic arm is attached to the support arm. The elastic arm has an arcuate engaging portion oriented toward an inside of the connector. When the card is correctly inserted into the connector, the bevel mates with the ramp, and the engaging portion is received in a notch of the card. The card can thereby move together with the support arm toward the contact module. When the card is wrongly inserted into the connector with the bevel of the card oriented away from the ejecting mechanism, the engaging portion of the elastic arm is elastically pushed outwardly by a lateral edge of the card. The engaging portion presses against an edge of the blocking tab, and the slide block is thereby blocked from moving toward the contact module. A leading edge of the card is blocked by the ramp, thereby preventing the card from reaching contacts of the contact module.

The above-described and additional objects, features and advantages in accordance with the present invention will be more apparent from the ensuing detailed description together with the accompanying drawings.

DETAILED DESCRIPTION OF THE PREFERRED EMBODIMENTS

Figure 1:
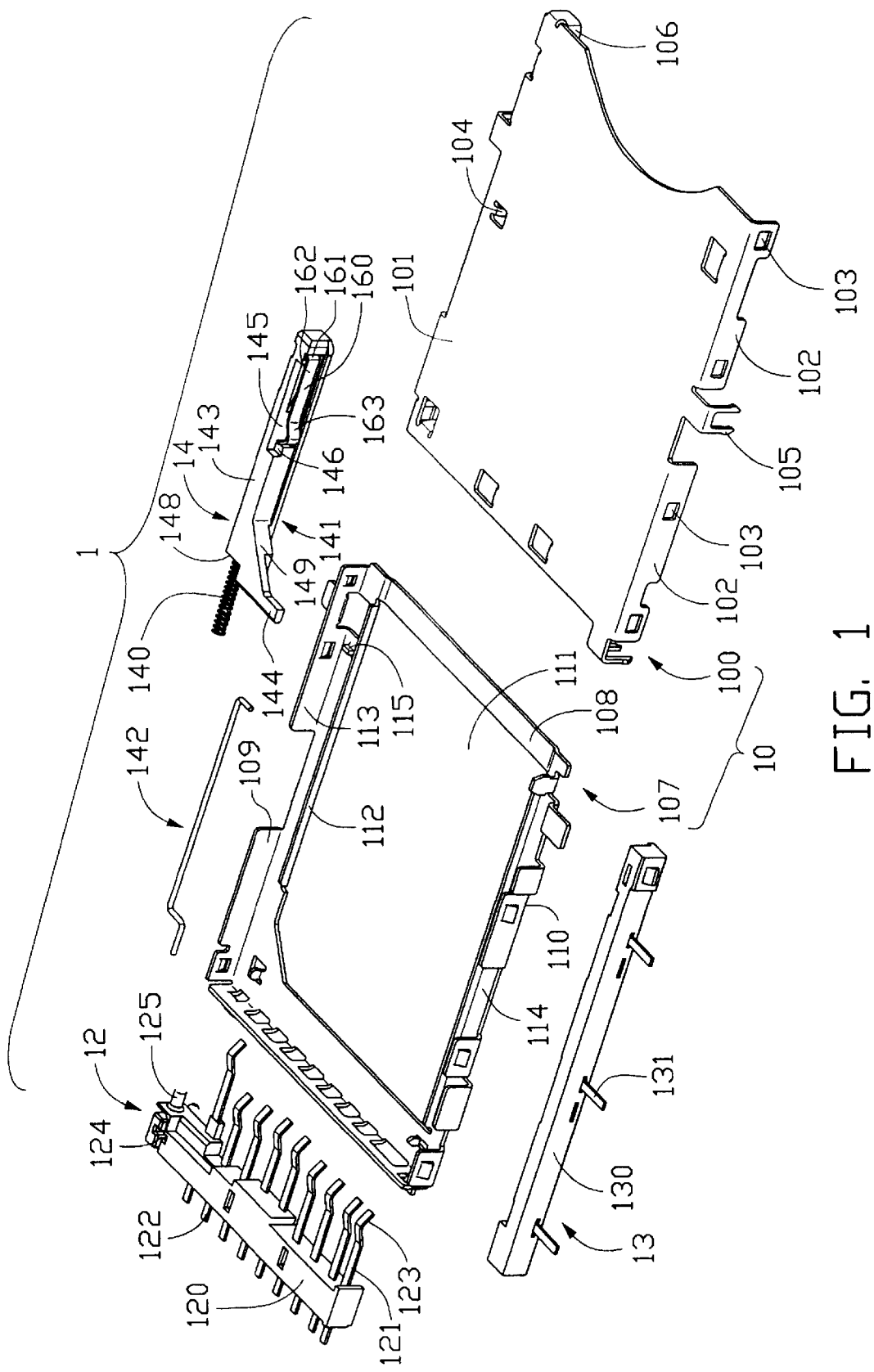
FIG. 1 is an exploded view of an electrical card connector in accordance with a preferred embodiment of the present invention.
Figures 2, 3:
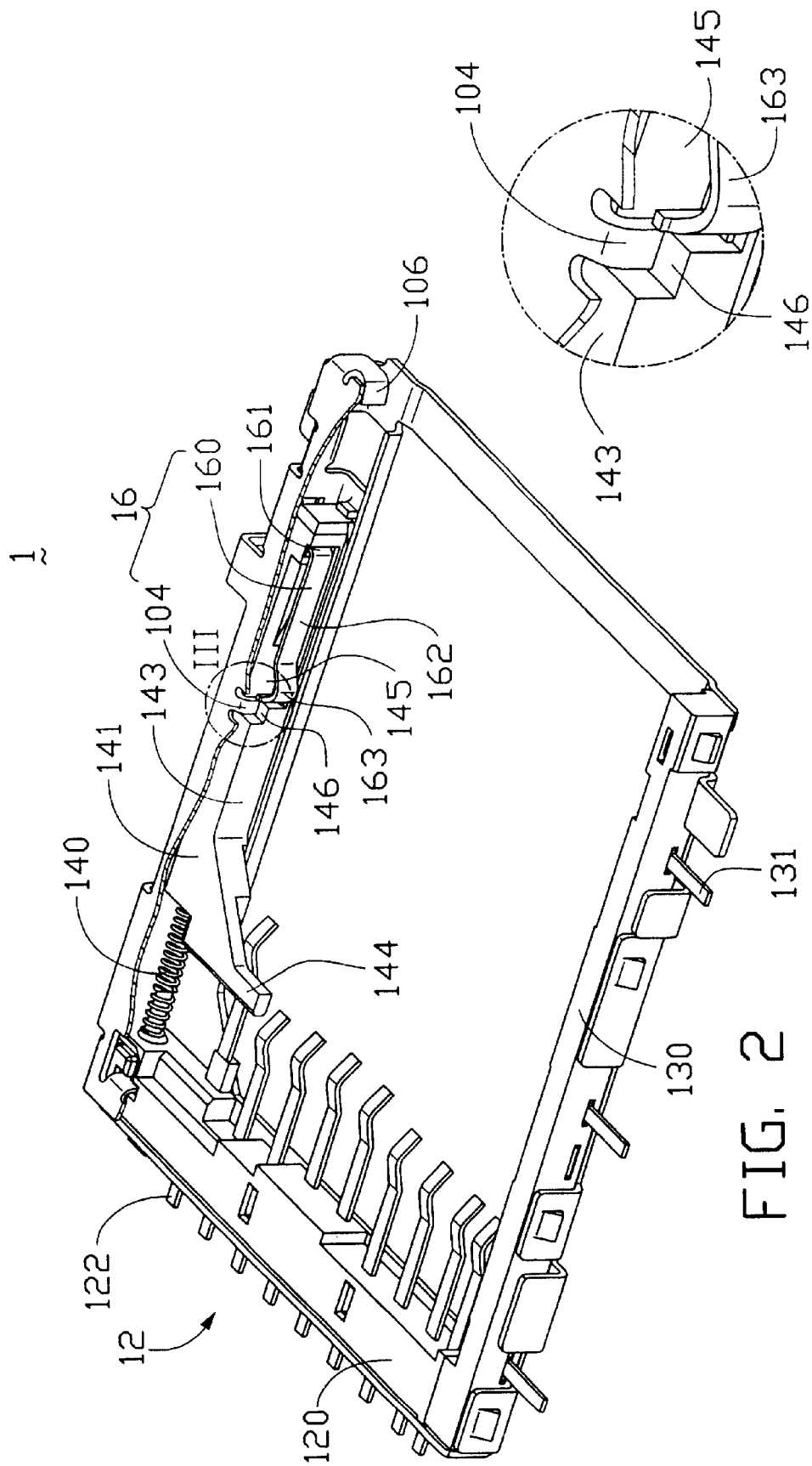
FIG. 2 is an assembled view of the connector of FIG. 1, but not showing an upper housing of a shield housing of the connector.
FIG. 3 is an enlarged view of a circled portion III of FIG. 2.

Referring to FIGS. 1 and 2, an electrical card connector 1 in accordance with a preferred embodiment of the present invention comprises a shield housing 10, a contact module 12, a switch module 13, an ejecting mechanism 14 and a polarization mechanism 16.

The shield housing 10 comprises an upper housing 100 and a lower housing 107. The upper housing 100 comprises an upper wall 101, and a pair of side walls 102 bent perpendicularly downwardly from each of opposite lateral edges of the upper wall 101. A plurality of holes 103 is defined in the side walls 102. A blocking tab 104 is bent perpendicularly downwardly from the upper wall 101 near one side wall 102. A plurality of downwardly extending locating feet 105 is formed near a rear edge and at the opposite lateral edges of the upper wall 101, for engaging in locating holes of a printed circuit board (not shown). A guide portion 106 is formed at a front of the upper housing 100 near the same side wall 102 near which the blocking tab 104 is formed. The guide portion 106 extends rearwardly from a front end of the upper housing 100 and parallel to the side walls 102, for guiding insertion of a complementary electrical card 2 into the connector 1 (see FIG. 4).

The lower housing 107 comprises a bottom wall 108, and first and second lateral walls 109, 110 bent upwardly from opposite sides of the bottom wall 108 respectively. The bottom wall 108 defines an opening 11 in a middle thereof. A flange 112 is upwardly bent from the bottom wall 108 at each of opposite sides of the opening 111. The first lateral wall 109 and its adjacent flange 112 cooperatively define a first accommodating groove 113 therebetween, for accommodating the ejecting mechanism 14. The second lateral wall 110 and its adjacent flange 112 cooperatively define a second accommodating groove 114 therebetween, for accommodating the switch module 13. A projection 115 is upwardly formed on a front portion of the bottom wall 108 between the first lateral wall 109 and its adjacent flange 112.

The contact module 12 comprises an insulative body 120, and a plurality of conductive contacts 121 disposed in the insulative body 120. Each contact 121 includes a solder portion 122 located at a rear of the insulative body 120 for soldering to the printed circuit board, and a touch portion 123 to engage with the card 2. A receiving slot 124 is defined near one end of the insulative body 120, and a post 125 extends forwardly from the same end of the insulative body 120. The receiving slot 124 and post 125 are for coupling with the ejecting mechanism 14.

The switch module 13 comprises a dielectric body 130, and a plurality of switch contacts 131 disposed in the dielectric body 130.

The ejecting mechanism 14 comprises a spring 140, a slide block 141, and a connecting rod 142 to link the spring 140 and the slide block 141. The slide block 141 includes a support arm 143, and an ejecting arm 144 that integrally extends perpendicularly from a rear portion of the support arm 143 toward an inside of the connector 1. A ramp 149 is formed between a front side of the ejecting arm 144 and an inner side of the support arm 143. A front deep recess 145 and a rear shallow recess 146 are defined in a front portion of the support arm 143. The two recesses 145, 146 are in communication with each other. A cutout 148 is defined in a junction of the support arm 143 and the ejecting arm 144.

In the preferred embodiment, the polarization mechanism 16 comprises the blocking tab 104 formed at the upper wall 101 of the upper housing 100, and an elastic arm 160 disposed on the support arm 143 of the ejecting mechanism 14. The elastic arm 160 includes a fixing portion 161 fixed to a front end of the support arm 143, a connecting portion 162 bent and extending rearwardly from the fixing portion 161, and an arcuate engaging portion 163 extending rearwardly from the connecting portion 162. The connecting and engaging portions 162, 163 are received in the deep recess 145 of the support arm 143, whereby the engaging portion 163 is oriented toward the inside of the connector 1.

Referring to FIGS. 2 and 3, in assembly, the contact module 12, the switch module 13 and the ejecting mechanism 14 are assembled on the lower housing 107 of the shield housing 10. The ejecting mechanism 14 and the switch module 13 are secured to opposite ends of the contact module 12. A rear end of the spring 140 of the ejecting mechanism 14 is fitted over the post 125 of the insulative body 120. A rear end of the connecting rod 142 is fitted in the receiving slot 124 of the insulative body 120. The ejecting mechanism 14 and the switch module 13 are then accommodated in the first and second accommodating grooves 113, 114, respectively. A front end of the spring 140 is located in front of the shallow recess 146. A front end of the connecting rod 142 is secured in a slit (not shown) of the support arm 143. A front edge of the support arm 143 abuts against a rear face of the projection 115 of the lower housing 107. The upper housing 100 is then attached onto the lower housing 107, such that the blocking tab 104 of the polarization mechanism 16 extends into the shallow recess 145. A topmost extremity of a free end section (not labeled) of the engaging portion 163 of the elastic arm 160 is disposed higher than a bottommost extremity of the blocking tab 104 (see FIG. 3).

Figure 4:
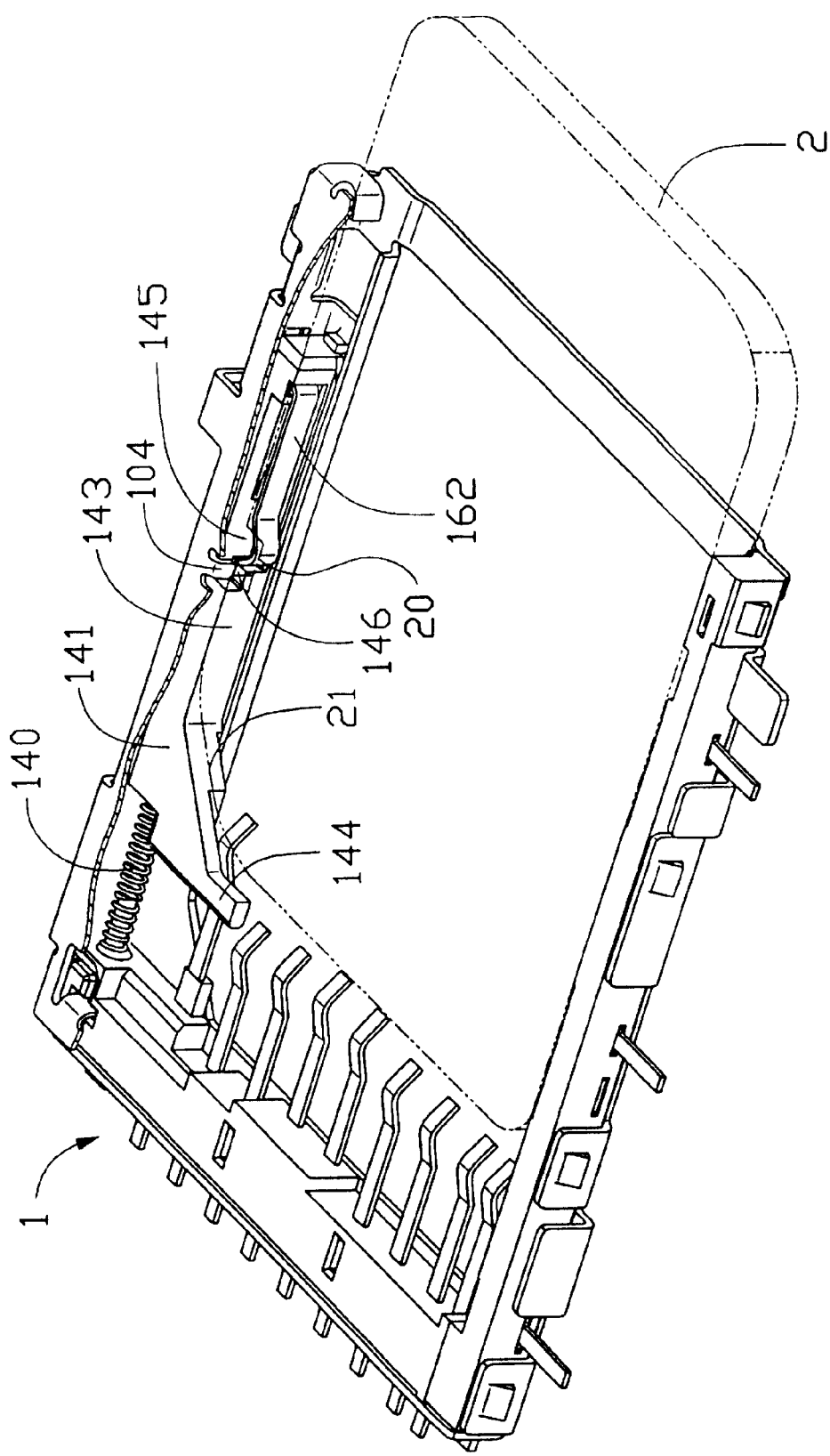
FIG. 4 is similar to FIG. 2, showing an electrical card correctly inserted into the connector.
Figure 5:
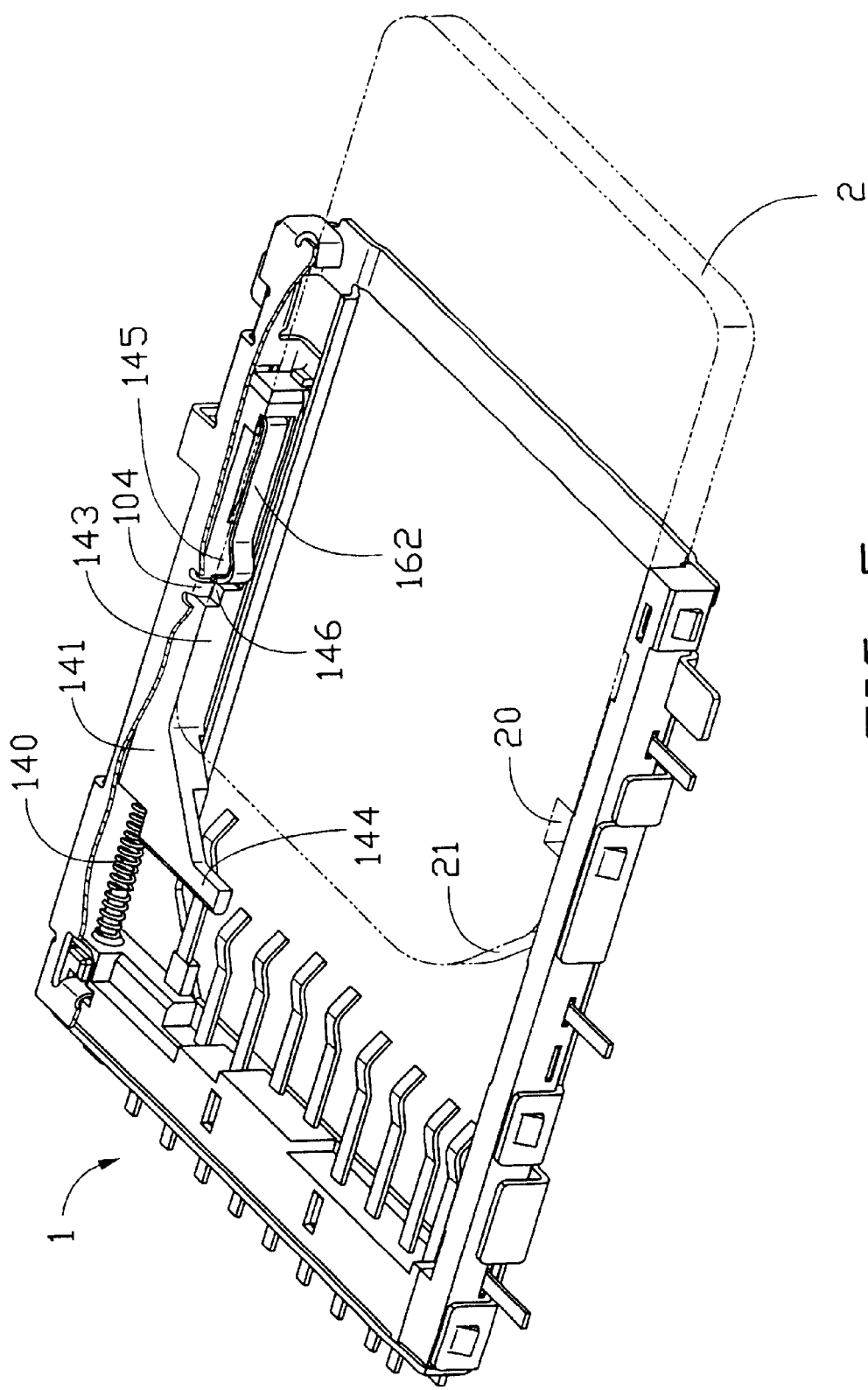
FIG. 5 is similar to FIG. 4, but showing the card wrongly inserted into the connector.

Referring to FIGS. 4 and 5, in use, the complementary electrical card 2 is shown by dotted lines. The card 2 has an engaging member comprising a notch 20 defined in a lateral side of the card 2. A bevel 21 is formed on a leading corner of the card 2, adjoining the same lateral side in which the notch 20 is defined.

FIG. 4 shows correct insertion of the card 2 into the connector 1. The notch 20 of the card 2 engagingly receives the engaging portion 163 of the elastic arm 160, and the bevel 21 of the card 2 mates with the ramp 149 of the ejecting arm 144. Therefore, when the card 2 is pushed inwardly, the support arm 143 can move together with it. The engaging portion 163 is not pressed by the card 2. Therefore, the end of the engaging portion 163 remains in a position whereby it can freely move past the blocking tab 104. The card 2 is pushed inwardly, and the support arm 143 freely moves toward the contact module 12 of the connector 1 past the blocking tab 104. The card 2 is thus fully inserted into the connector 1 to successfully engage with the contacts 121 of the contact module 12.

FIG. 5 shows wrong insertion of the card 2 into the connector 1. The notch 20 of the card 2 is oriented away from the ejecting mechanism 14 of the connector 1. Therefore when the card 2 is inserted, the engaging portion 163 of the elastic arm 160 is elastically moved outwardly by a lateral edge of the card 2. The free end section (not labeled) of the engaging portion 163 presses against a frontmost edge of the blocking tab 104, and the slide block 141 is thereby blocked from moving toward the contact module 12 by the blocking tab 104. Therefore the support arm 143 cannot move together with the card 2. A leading edge of the card 2 is blocked by the ramp 149 of the ejecting mechanism 14. The card 2 is thus preventing from reaching the contacts 121 of the contact module 12.

Variations of the above-described preferred embodiment may be made according to the spirit of the present invention. For example, the blocking tab 104 of the polarization mechanism 16 of the preferred embodiment may be replaced by a blocking tab formed by any of the lower housing 107, the shield housing 10, or any side wall 102 or first or second lateral wall 109, 110 of the upper and lower housings 100, 107. When a blocking tab is formed by the lower housing 107 of the shield housing 10, a corresponding recess is defined in the support arm 143 of the ejecting mechanism 14 to slidingly receive the blocking tab. When a blocking tab is formed by any side wall 102 or first or second lateral wall 109, 110 of the upper and lower housings 100, 107, a corresponding recess is defined in the support arm 143 of the ejecting mechanism 14 to slidingly receive the blocking tab.

Figure 6:
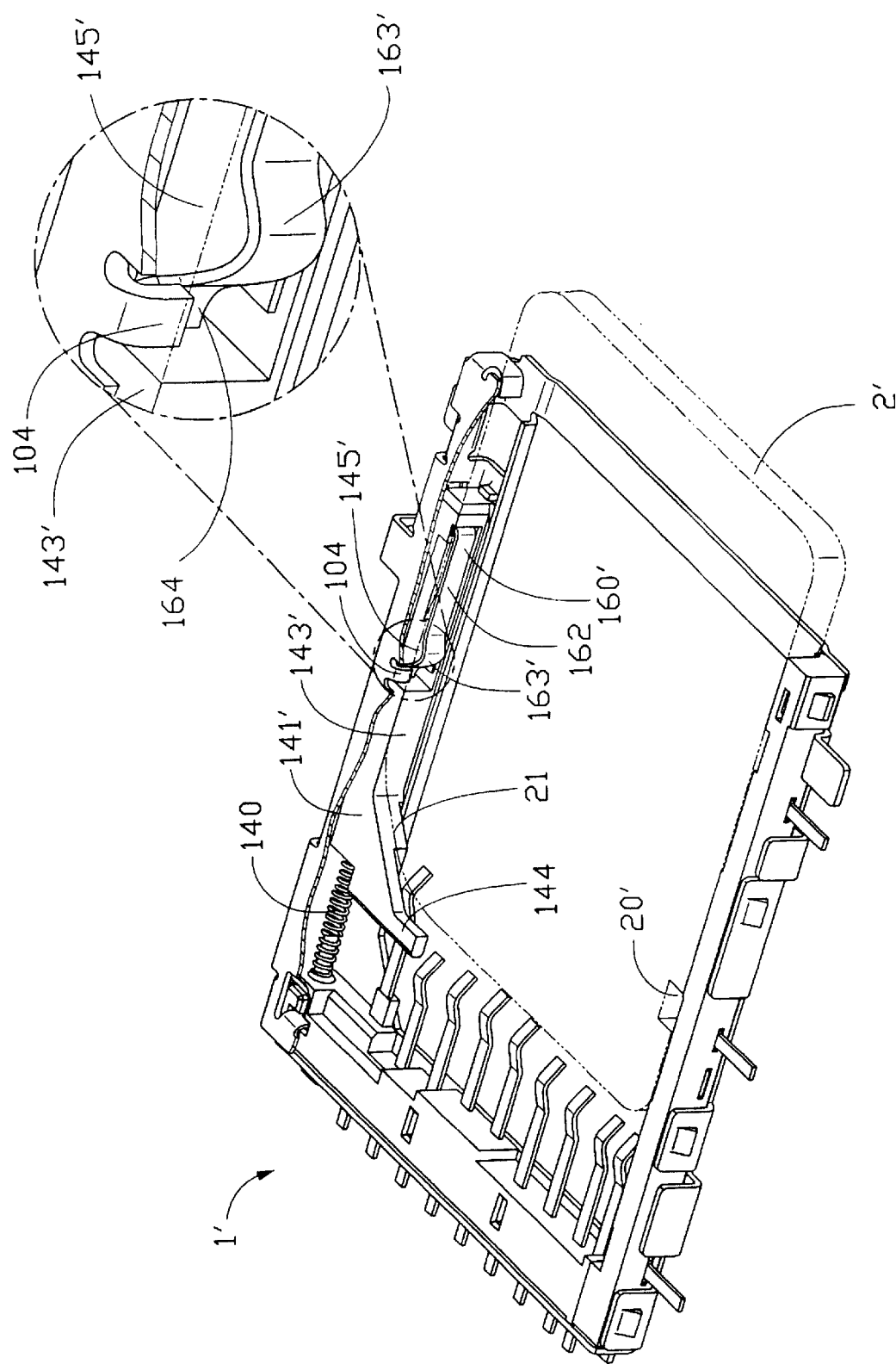
FIG. 6 shows an electrical card connector in accordance with an alternative embodiment of the present invention, together with an electrical card correctly inserted into the connector.
Figure 7:
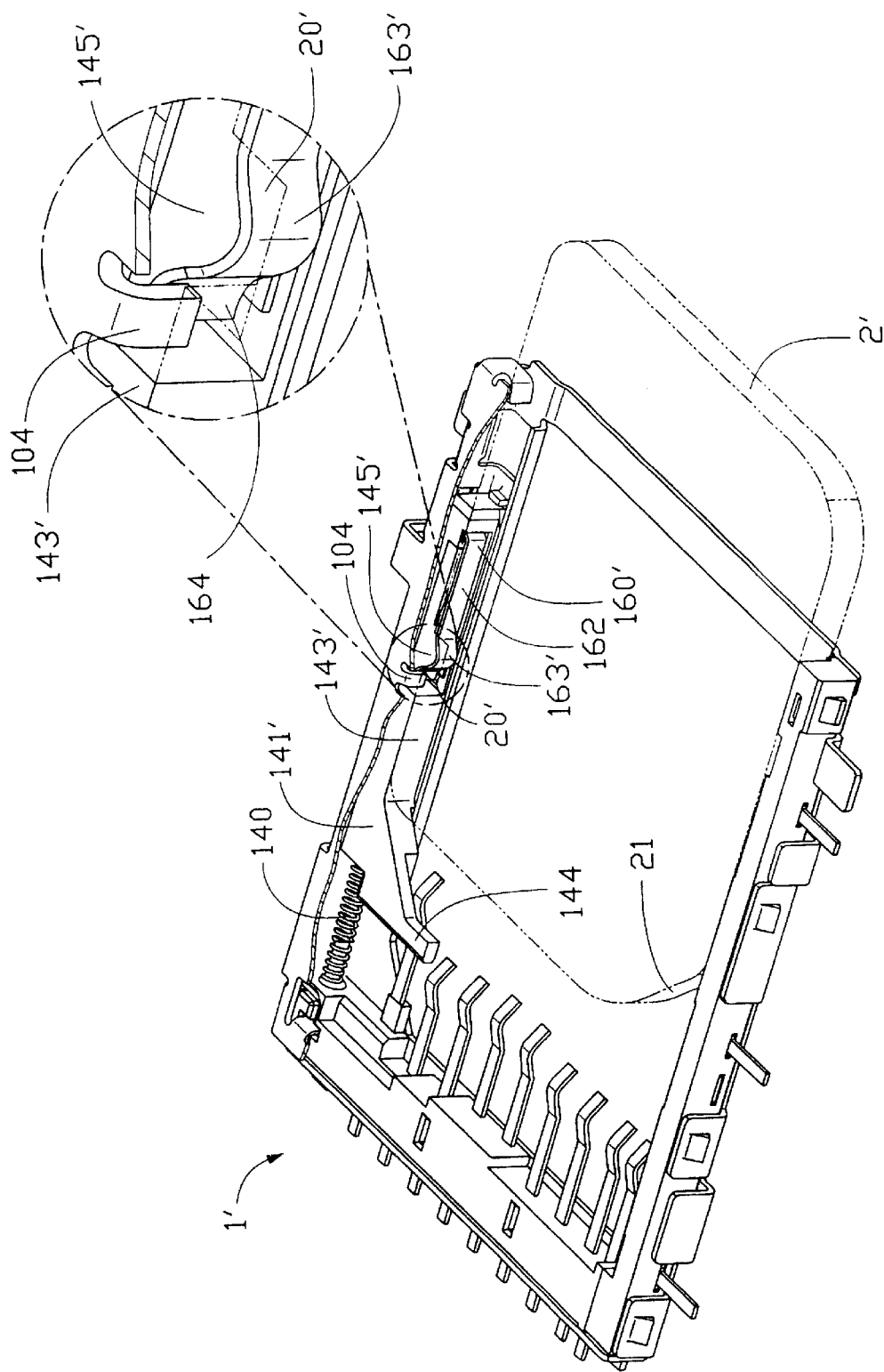
FIG. 7 is similar to FIG. 6, but showing the card wrongly inserted into the connector.

FIGS. 6 and 7 show a connector 1' in accordance with an alternative embodiment of the present invention. A slide block 141' has a support arm 143'. A front deep recess 145' is defined in a front portion of the support arm 143'. An arcuate end portion 164 is formed at a free end of an arcuate engaging portion 163' of an elastic arm 160'. Referring particularly to the inset in FIG. 7, a height of the end portion 164 is higher than a height of the engaging portion 163'. A step (not labeled) is thus formed at the end portion 164 where it adjoins the engaging portion 163'. A topmost extremity of the end portion 164 is disposed higher than a bottommost extremity of the blocking tab 104. An inner face of the end portion 164 abuts a frontmost edge of the blocking tab 104. A topmost extremity of the engaging portion 163' is disposed lower than the bottommost extremity of the blocking tab 104. In further alternative embodiments, the end portion 164 may be other than arcuate. For example, the end portion 164 may have an L-shaped configuration.

In the alternative embodiment, a complementary electrical card 2' defines a notch 20' in a lateral side thereof that is generally opposite to the bevel 21 thereof. FIG. 6 shows correctly insertion of the card 2' into the connector 1'. The engaging portion 163' of the elastic arm 160' is elastically moved outwardly by a lateral edge of the card 2'. The end portion 164 is accordingly moved outwardly to a position where it can freely move past the blocking tab 104. The engaging portion 163' can also freely move under the blocking tab 104. The bevel 21 of the card 2' mates with the ramp 149 of the ejecting arm 144. The card 2' is pushed inwardly, and the support arm 143' freely moves toward the contact module 12 of the connector 1' past the blocking tab 104. The card 2' is thus fully inserted into the connector 1' to successfully engage with the contacts 121 of the contact module 12.

FIG. 7 shows wrong insertion of the card 2' into the connector 1'. The notch 20' of the card 2' engagingly receives the engaging portion 163' of the elastic arm 160'. Simultaneously, a leading edge of the card 2' is blocked by the ramp 149 of the ejecting mechanism 14. The engaging portion 163' is not pressed by the card 2'. Therefore, the inner face of the end portion 164 presses against the frontmost edge of the blocking tab 104, and the slide block 141' is thereby blocked from moving toward the contact module 12 by the blocking tab 104. Therefore the support arm 143' cannot move together with the card 2'. The card 2' is thus preventing from reaching the contacts 121 of the contact module 12.

Although the present invention has been described in conjunction with particular preferred embodiments, it is quite obvious that the present invention is in no way limited thereto. Various alternatives and modifications can be made to the preferred embodiments without in any way departing either from the scope or spirit of the present invention.

I claim:

1. An electrical car connector for engaging with an electrical card having a bevel on a corner thereof and a void in a lateral edge thereof, the connector comprising:

a contact module comprising an insulative body and a plurality of conductive contacts adapted for electrically connecting with the card;

a metal shield housing covering the contact module;

an ejecting mechanism disposed in a side of the housing, the ejecting mechanism having a support arm and an ejecting arm, the ejecting arm extending from a rear of the support arm toward an inside of the connector, a ramp being formed between the support arm and the ejecting arm, an elastic arm being attached to the support arm and having an arcuate engaging portion oriented toward the inside of the connector; and a polarization mechanism comprising a blocking tab extending from the shield housing toward the ejecting mechanism;

wherein when the card is correctly inserted into the connector, the engaging portion is received in the void of the cad and the bevel mates with the ramp; and when the card is wrongly inserted into the connector, the engaging portion is pushed toward an outside of the connector by a lateral edge of the card and blocked by the blocking tab, whereby the card is prevented from reaching the contacts; wherein the support arm of the ejecting mechanism defines at least one recess for slidingly receiving the blocking tab; wherein the shield housing includes an upper housing and a lower housing, and the upper and lower housings respectively include an upper wall, a lower wall and a plurality of side walls disposed on opposite sides of the upper and lower walls; wherein the blocking tab of the polarization mechanism extends from one of the side walls of the upper and lower housings.

2. The electrical card connector as claimed in claim 1, wherein when the card is correctly inserted, the blocking tab remains free from the elastic arm; and when the card is wrongly inserted, the engaging portion of the elastic arm presses against the blacking tab.

3. The electrical card connector as claimed in claim 1, wherein when the engaging portion is pushed toward the outside of the connector by the lateral edge of the card, the elastic arm is elastically deformed to press the engaging portion against the blocking tab.

4. The electrical card connector as claimed in claim 1, wherein the blocking tab of the polarization mechanism extends from the upper housing of the shield housing.

5. The electrical card connector as claimed in claim 1, wherein the blocking tab of tile polarization mechanism extends from the lower housing of the shield housing.

6. The electrical card connector as claimed in claim 1, wherein the blocking tab of the polarization mechanism extends from one of the side walls of the upper and lower housings.

7. An electrical connector assembly comprising:

a contact module with a plurality of contacts therein;

a metal shield device attached to the contact module and defining a receiving space;

an ejecting mechanism positioned at one side of the contact module and moveable relative to both the shield and the contact module along a front-to-back direction, said ejecting mechanism defining a ramp around an ejecting arm, and an elastic arm with an engaging portion thereof; and an electronic card inserted into the receiving space, said card defining a bevel in compliant abutment with said ramp, and a notch receivably engaging the engaging portion when said card is correctly inserted into the receiving space, so as to result in a co-movement between said ejecting mechanism and said card along said front-to-back direction due to engagement between the ejecting arm and an front portion of the card; wherein said elastic arm is ready to be deflected to allow the engaging portion to be disengaged from or engaged within the notch for insertion or withdrawal of the card when said ejecting mechanism is located at an outermost loading/unloading position; wherein the metal shield device includes an upper housing and a lower housing, and the upper and lower housings respectively include an upper wall, a lower wall and a plurality of side walls disposed on opposite sides of the upper and lower walls; wherein said metal shield device includes a blocking tab located on a way of movement of said ejecting mechanism, wherein the elastic arm is deflected by the card to engage said blocking tab, when said card is incorrectly inserted into the receiving space, for preventing said ejecting mechanism from further forwardly moving, thus preventing said card from forwardly moving further also.

* * * * *